June 29, 1926.
R. L. BALLOU
CAR COUPLER
Filed April 1, 1925    2 Sheets-Sheet 1
1,590,489
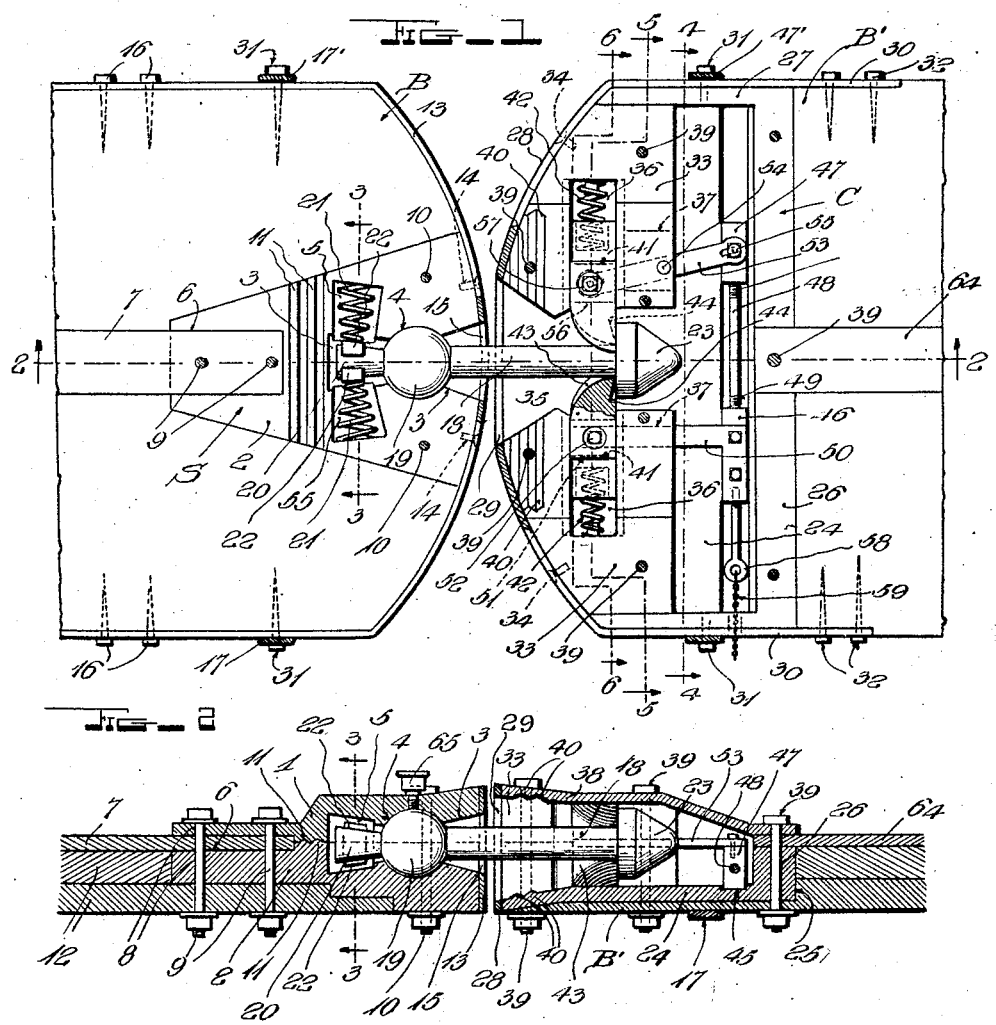
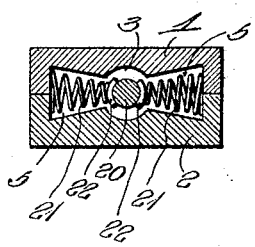
Witness
Inventor
R. L. Ballou
By H. B. Willson & Co.
Attorneys

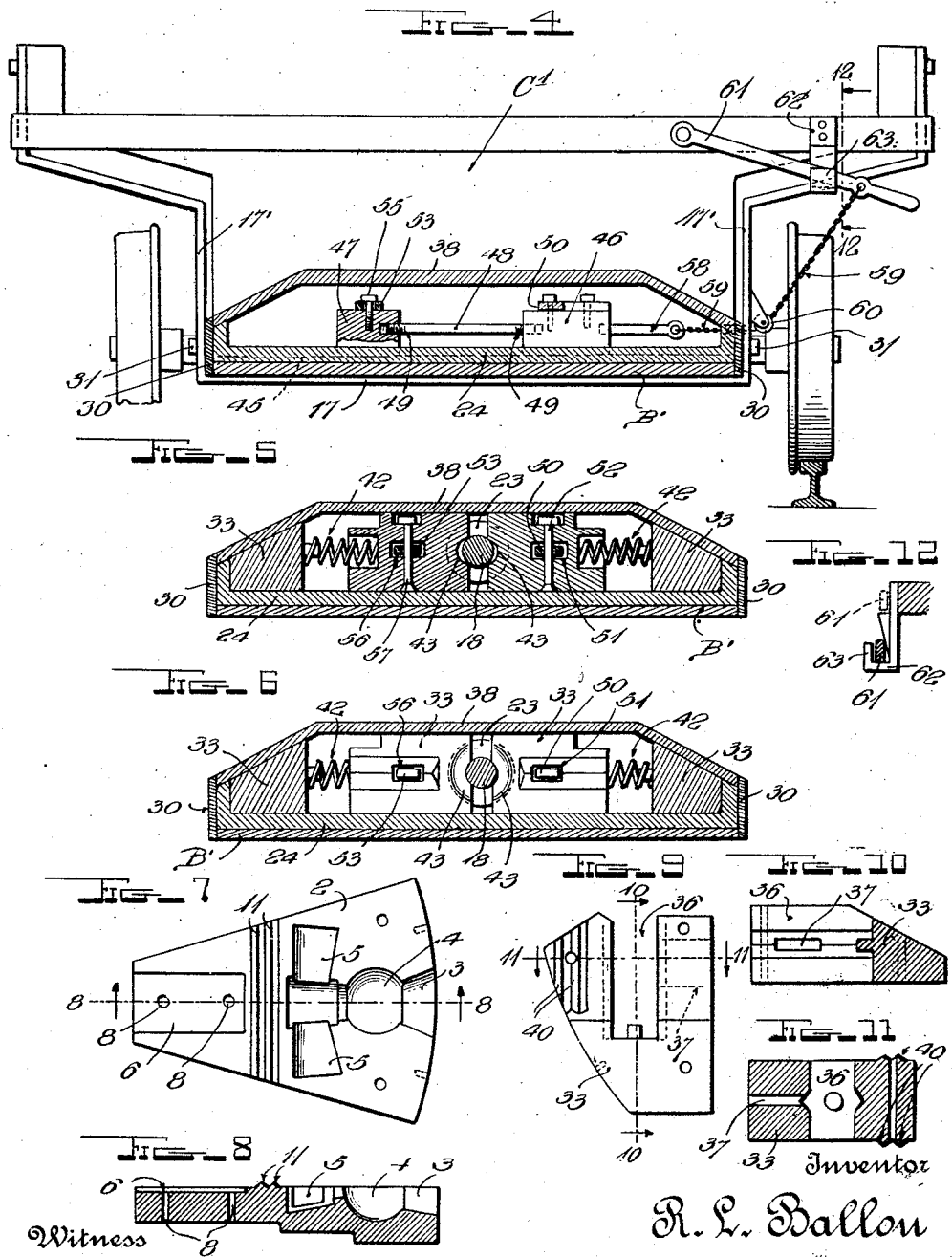

Patented June 29, 1926.

1,590,489

UNITED STATES PATENT OFFICE.

ROBERT L. BALLOU, OF HAZARD, KENTUCKY, ASSIGNOR OF ONE-THIRD TO ALBERT STACY, OF LOTHAIR, KENTUCKY, AND ONE-THIRD TO GEORGE D. STACY, OF HAZARD, KENTUCKY.

CAR COUPLER.

Application filed April 1, 1925. Serial No. 19,967.

This application relates primarily to car couplers of the type intended for use on mine cars, or similar, comparatively small cars, for instance, those pulled by donkey engines for hauling dirt.

One object of the invention is to improve upon the construction shown by U. S. patent to Albert Stacy, No. 1,483,691 of February 12, 1924, which patent was directed solely to a clutch unit of a coupler for coaction with a headed shank projecting from another coupler unit.

With the foregoing in view, the invention resides in the novel subject matter hereinafter described and claimed, the description being supplemented by the accompanying drawings.

Figure 1 is a top plan view with parts removed and in section, showing both units (C and S) of the improved coupler in operative relation with each other.

Figure 2 is a central vertical longitudinal section as indicated by line 2—2 of Fig. 1.

Figure 3 is a detail vertical transverse section through the head only of the coupler unit S as indicated by the lines 3—3 of Figs. 1 and 2.

Figure 4 is a vertical transverse sectional view through the clutch unit C of the coupler, illustrating also an end elevation of the car to which it is applied.

Figures 5 and 6 are vertical transverse sectional views as indicated by lines 5—5 and 6—6 of Fig. 1.

Figure 7 is a plan view of one section of the coupler head of the unit S of the coupler.

Figure 8 is a longitudinal section on line 8—8 of Fig. 7.

Figure 9 is a plan view of one of the blocks which guide the movable jaws of the clutch unit C.

Figures 10 and 11 are vertical sectional views as indicated by lines 10—10 and 11—11 of Fig. 9.

Figure 12 is a detail vertical section on line 12—12 of Fig. 4, illustrating the preferred means for holding the coupler controlling hand lever in either of its two positions.

In the drawings above briefly described, S designates a shank-carrying coupler unit, and C has reference to a clutch unit to engage the shank of the unit S. The unit S is in its entirety my own invention, but only certain distinct improvements of the clutch unit C were invented by me, the general organization of parts being similar to the construction shown in the Stacy patent, above referred to.

The unit S comprises a metal head which is formed of upper and lower sections 1 and 2, said sections being jointly recessed to provide a longitudinal passage 3 having a spherical portion 4 between its ends. The head sections 1 and 2 are also recessed to provide a pair of pockets 5 which open into opposite sides of the passage 3, in inwardly spaced relation with its spherical portion 4. In the preferred construction, the inner faces of the head sections 1 and 2 are provided with still further recesses 6 which jointly receive the outer end of a draw bar 7, and openings 8 are formed in said sections to receive bolts 9 which secure the draw bar in place as well as assisting in clamping the sections of the head together. Other bolts 10 have been shown passing through the outer portions of the head sections 1 and 2 to further secure them together, and to take strain from all of the bolts or other fasteners which might be used, the head sections are preferably formed with transverse, inter-engaging ribs 11, as shown clearly in Figs. 1, 2, 7 and 8.

A suitable number of the bolts which hold the sections of the head together, preferably pass also through portions 12 of the floor and bumper boards of the car which carries the unit S, the bumper being designated in a general way at B. The outer end of the head is flush with the outer transverse edge of the bumper B, and to generally reinforce the structure and protect the edges of the bumper, as well as providing effective anchoring means for the head, I provide a substantially U-shaped, horizontally disposed, metal plate 13 which extends along the edges of the bumper and the outer end of the head 1—2, the intermediate portion of this plate being secured by suitable fasteners 14 to said outer end of the head and being formed with an opening 15 which registers with the passage 3. The end portions of the plate 13 are secured to the side edges of the bumper and adjacent portions of the car body, for instance, by lag screws 16, and certain of these screws may well pass through a brace or hanger 17, the latter being preferably in the form of a stirrup to extend under the bumper B.

A shank 18 is provided to connect the two coupler units S and C, a portion of said shank being received in the passage 3 and being provided with an integral ball 19 which is received for rotary movement in any direction, in the spherical socket portion 4 of said passage 3. The inner extremity 20 of the shank 18 is preferably somewhat tapered as shown in Figs. 1 and 2, and springs 21 (preferably conical) disposed in the pockets 5, are provided to co-operate with said end 20 in normally centering the shank 18 when the two coupler units are disconnected from each other. Preferably semi-circular shoes 22 are interposed between the inner ends of the springs 21 and the end 20 of the shank 18. It will be observed that both the inner and outer ends of the passage 3 are flared and that the shank 18 is thus free to have pivotal movement in all directions, about the ball 19. Moreover, this shank may freely rotate, thereby well adapting the improved coupler to use upon cars which are bodily inverted to discharge their loads. Whenever the two coupler units are disconnected from each other, the shank 18 is centered by the springs 21, so that its tapered head 23 is in readiness to properly engage the clutch unit C, when two cars are brought together. This clutch unit will now be described.

24 designates a base plate inset as at 25, in a bumper B′ of a car C′ or otherwise related with said bumper. This base plate is provided with a convex outer edge and is provided at its inner edge with an upstanding flange 26 for disposition transversely of the car. The side edges of this plate are also formed with upstanding flanges 27 which lead from the end of the flange 26 to the above-named convex outer edge of the base plate. The intermediate portion of a substantially U-shaped horizontally disposed plate 28 abuts this convex outer edge of the base plate 24 and is provided with a relatively large opening 29 to receive the shank 18. The end portions 30 of the plate 28 extends rearwardly at the outer sides of the flanges 27 and are secured to the latter by screws or the like 31, these ends 30 being also secured to the bumper B′ by lag screws or other appropriate fasteners 32. The plate 28, in addition to co-operating with the base plate 24 and associated parts, in forming a housing for the clutch unit C extends around the edges of the bumper B′ to effectively protect them, establishing a rigid structure and a rigid connection between the unit C and the car. The screws 31 preferably secure the ends of a hanger or hangers 17′ to the plate 28, said hanger or hangers being similar to the stirrup members 17 above described.

Two metal blocks 33 are disposed in the angles between the flanges 27 and the curved intermediate portion of the plate 28, and the latter may be secured to said blocks by screws or the like 34. These blocks are disposed in laterally spaced relation to provide a longitudinal passage 35 registering with the opening 29 to receive the shank 18, and each of said blocks is formed with a guideway 36 opening into said passage 35. Moreover, each block 33 is provided with an opening 37 which leads from the guideway 36 to the inner edge of said block, for a purpose to be described. A top plate 38 rests upon the blocks 33 and the flanges 26 and 27, and engages the plate 28 also, bolts or other fasteners 39 being passed through said top plate and blocks, and through the base plate 24. These bolts also preferably pass through the sub-jacent portion of the bumper B′ to assist in securing the entire coupler unit C to the car C′. In order to take strain from the bolts or the like 39 and to provide a more rigid structure than could otherwise be obtained, the plates 24 and 38, and the blocks 33, are provided with inter-engaging ribs 40.

Two jaws 41 are slidably mounted in the guideways 36 and are normally projected into the passage 35, by coiled compression springs 42, the inner ends of said jaws being preferably shaped in the manner disclosed more particularly in Figs. 1, 2, 5 and 6, so that they may readily be engaged by and separated by the conical head 23 of the shank 18 when two cars are brought together. The formation in question is designated at 43 and consists in curving and slightly channeling the inner ends of the jaws 41. In addition to this formation, the inner sides of these jaws, adjacent their inner ends, are preferably formed with angular recesses 44, either of which may receive a portion of the head 23, when the shank 18 must necessarily swing laterally to some extent, while the cars are rounding a curve.

Between the blocks 33 and the flange 26, the base plate 24 is formed with a groove 45 which is parallel with said flange 26. This groove receives a releasing slide for the jaws 41, said slide preferably comprising two blocks 46 and 47, adjustably connected with each other, for instance by a rod 48 whose ends are threaded as at 49, into said blocks. An arm 50 is rigidly secured to the block 46 and extends therefrom through the opening 37 of one of the blocks 33, into an opening 51, in one of the jaws 41, the arm being secured to the jaw by a bolt or the like 52. A lever 53 passes through the opening 37 of the other block 33, is fulcrumed between its ends to this block as indicated at 54, and is connected pivotally and slidably at one of its ends with the block 47, as indicated at 55. The other end of the lever extends into an opening 56 in the adjacent jaw 41 and is pivotally and slidably connected to the latter as at 57.

By suitable means 58, a chain 59 is connected with the block 46, said chain extending to the exterior of the clutch unit housing and serving to operate the slide 46—47—48. When this chain is pulled, the arm 50 and the lever 53 function to release the jaws 41, permitting the head 23 of the clutch unit shank 18 to withdraw from the clutch unit C, but as soon as the chain is released, the springs 42 act to again project the curved inner ends of said jaws into the passage 35 in readiness to again engage the head 23, when two cars are to be coupled together. To limit the inward projection of the jaws 41, the lever 53 and the arm 50 may well strike ends of the openings 37.

In the preferred form of construction, chain 59 passes around a pulley 60 at the exterior of the housing and is connected with a hand lever 61 fulcrumed to one end of the car C'. Normally, that is, when two cars are coupled together, this lever rests upon a horizontal support 62 which is suitably secured to the car as shown most clearly in Fig. 12. This support is provided with an upstanding lug 63, and when the lever is raised to withdraw the jaws 41 from engagement with the head 23, said lever may rest upon this lug as shown in dotted lines in Fig. 12 thus holding the jaws retracted for any desired length of time.

It will be seen from the foregoing that not only has the construction shown by Patent 1,483,691, been materially improved, but that I have provided an effective shank-carrying unit for co-action with the clutch unit. Marked advantages exist for the details herein disclosed and they are therefore preferably followed, but within the scope of the invention as claimed, modifications may of course be made.

At 64, a draw bar has been shown secured between the flange 26 and the top plate 38 by one of the bolts 39, said flange being recessed to receive said bar.

I claim:

1. A car coupler unit comprising a body adapted to be secured to a car bumper, said body having an opening to receive a car connecting shank, and a substantially U-shaped metal plate secured at its intermediate portion to said body and having an opening alined with the aforesaid opening, said plate being adapted to be secured to the edges of the bumper and its ends being adapted to be secured to the car body.

2. A car coupler unit comprising a base plate having its inner edge provided with an upstanding flange for disposition transversely of the car, said plate being provided at its side edges with similar flanges extending from the first named flange to the outer edge of the plate for disposition longitudinally of the car, a vertical plate secured against the outer edge of said base plate and rising from the latter, a pair of blocks secured in the angles between said vertical plate and said longitudinal flanges and spaced apart to provide a longitudinal passage, said vertical plate having an opening alined with said passage, said blocks being formed with guideways transverse to and opening into said passage and being also formed with openings from said guideways to the inner edges of the blocks, a pair of spring-projected shank-engaging jaws slidable in said guideways, a slide between the first named flange and the blocks mounted for movement in parallel relation with the former, a rigid arm extending from said slide through the aforesaid opening of one block and secured to one of said jaws, a lever extending through the opening of the other block and pivoted to the other jaw and to said slide, and a top plate secured upon said blocks with its edges disposed in contact with the aforesaid vertical plate and flanges.

3. A car coupler unit comprising a base plate, a top plate above the same, a pair of blocks secured between said plates and spaced apart to provide a longitudinal passage, said blocks having guideways opening sage to opposite sides of said passage and also having openings from said guideways to the inner edges of the blocks, spring-projected jaws slidable in said guideways and having openings for registration with the block openings, a transverse slide mounted between the top and base plates adjacent the inner edges of the two blocks, an arm passing through the opening of one of the aforesaid blocks and secured at one end in the opening of the adjacent jaw, the other end of said arm being secured to said slide, and a lever fulcrumed between its ends in the opening of the other block, one end of said lever being connected to said slide, the other end of said lever being connected to the adjacent jaw in the opening of the latter.

4. A car coupler unit comprising a housing having a base plate, a pair of jaws over said base plate, and a slide in the housing connected at spaced points with said jaws, the upper side of said base plate having a groove in which said slide is slidably guided.

5. A car coupler unit comprising a base plate, a pair of jaws thereover, and a slide connected at spaced points with said jaws, said slide comprising two sections connected respectively with said jaws, and an adjustable connection between said sections.

6. A car coupler unit comprising a base plate, a pair of jaws thereover, and a slide connected at spaced points with said jaws, said slide comprising two sections connected respectively with said jaws, and a rod connecting said sections and adjustably threaded into the same.

7. A car coupler unit comprising a housing structure adapted to be secured to a car bumper and having a passage to receive a coupling shank of another coupler unit, and a horizontal U-shaped plate embracing and secured to said housing, the intermediate portion of said plate having an opening alined with said passage, said plate being adapted to engage the edges of the bumper to protect the same, the ends of said plate being adapted to be secured to the car body.

In testimony whereof I have hereunto affixed my signature.

ROBERT L. BALLOU.